INVENTOR
CHARLES A. LEE
BY Anderson, Luedeka, Fitch
Even & Tabin
ATTORNEYS

ADJUSTABLE DRAINAGE DEVICE WITH CONTROLLABLE AREA OF SUCTION

INVENTOR
CHARLES A. LEE
BY Anderson, Luedeka, Fitch, Even & Tabin
ATTORNEYS

ADJUSTABLE DRAINAGE DEVICE WITH CONTROLLABLE AREA OF SUCTION

INVENTOR.
CHARLES A. LEE
BY Anderson, Luedeka, Fitch, Even & Tabin
ATTORNEYS

INVENTOR.
CHARLES A. LEE
BY Anderson, Luedeka, Fitch, Even & Tabin
ATTORNEYS

ADJUSTABLE DRAINAGE DEVICE WITH CONTROLLABLE AREA OF SUCTION

Filed Aug. 18, 1964 8 Sheets-Sheet 5

INVENTOR.
CHARLES A. LEE
BY Anderson, Luedeka, Fitch, Even & Tabin
ATTORNEYS

ADJUSTABLE DRAINAGE DEVICE WITH CONTROLLABLE AREA OF SUCTION

INVENTOR.
CHARLES A. LEE
BY Anderson, Luedeka, Fitch, Even & Tabin
ATTORNEYS

INVENTOR
CHARLES A. LEE
BY Anderson, Luedeka, Fitch, Even & Tabin
ATTORNEYS

ADJUSTABLE DRAINAGE DEVICE WITH CONTROLLABLE AREA OF SUCTION

Filed Aug. 18, 1964

INVENTOR
CHARLES A. LEE
BY Anderson, Luedeka, Fitch, Even & Tabin
ATTORNEYS

United States Patent Office 3,332,838
Patented July 25, 1967

3,332,838

ADJUSTABLE DRAINAGE DEVICE WITH CONTROLLABLE AREA OF SUCTION

Charles Allen Lee, Knoxville, Tenn., assignor to International Paper Company, New York, N.Y., a corporation of New York Filed Aug. 18, 1964, Ser. No. 390,302
9 Claims. (Cl. 162—352)

This invention relates generally to methods and apparatus for making paper. More specifically the invention relates to a method of forming a web from the papermaking fibers and to apparatus for carrying out the method. The invention is more particularly directed to means for removing water from the web as it is being formed on the forming medium or carrier.

In a Fourdrinier papermaking machine a suspension of papermaking fibers or stock is discharged through an orifice, which may be adjusted by a movable upper member called a slice, onto a moving endless forming carrier, usually in the form of a wire screen and hence often called a wire, although sometimes it is in the form of a plastic screen. The moving carrier travels around and between a breast roll and a couch roll. The slice is ordinarily at the breast roll. Following the breast roll, the stock on the carrier may be passed over one or more forming boards followed by various water removal devices such as table rolls, wipes, foils, suction boxes, and suction rolls. Water is removed by these devices and the paper web is formed in the process. The carrier is then passed around the couch roll where the formed web is ordinarily removed from the carrier and passed to the press section of the papermaking machine for further dewatering. The carrier then returns to the breast roll.

When table rolls are used for water removal and formation of the paper sheet, the movement of the carrier and the table rolls produces a suction beneath the carrier immediately following the separation of the carrier from the surface of the table rolls which draws water from the web as is formed on the carrier. This desirable action, however, is generally accompanied by undesirable features. Ordinarily the breaking of the suction does not occur straight across the sheet, resulting in uneven formation and streaking of the paper sheet. Also, the operation of the table rolls is usually accompanied by "kick up" (spouting) which is the formation of upward splashings of columns of stock from the forming carrier. This causes further disruption of the web as it is being formed and results in poor paper formation. "Kick up" is generally aggravated by high speed formation. These disturbances are also aggravated by carry over of water on the table rolls from previous water removal to the point where it is forced against the underside of the carrier. Some of these disadvantages are somewhat helped by the use of baffles between the rolls and by the use of grooved table rolls to reduce the suction so as to make the action less violent. Baffles and grooved table rolls, however, have the undesirable feature of reducing the amount of water which would be removed by solid table rolls.

When foils are used the suction created is less than half of the suction which would be produced by using a similar number of rotating table rolls having a comparable radius of curvature of the point of separation of the foils and table rolls from the carrier. As in the case of table rolls the breaking of the vacuum does not occur straight across the sheet resulting in streaking of the paper. In addition foils present certain mechanical problems. Although some foils include a means for adjusting the angle of the foil relative to the forming carrier, this is generally a difficult adjustment.

In accordance with the present invention, a novel drainage device has been provided as an improvement to the rotating table rolls. In one form of the invention, the device is in some ways like a stationary table roll and comprises a cylindrical bar with a flat portion cut away on the downstream side of the bar, with the bar held stationary at a particular angular adjustment. The bar acts much like a stationary table roll down to the flat portion. The adjustment of the angular disposition of the flat portion determines the area over which suction is applied. Thus, by making the device adjustable, it is possible to provide for adjustment of the amount of suction produced at each device. Furthermore, the suction is relieved abruptly at the beginning of the flat portion, which, being straight across the machine, does not streak the paper.

Further in accordance with the present invention, a wipe may be provided ahead of the bar to wipe water from the underside of the carrier and hence control the amount of water carried into the nip between the carrier and the bar thus preventing the violent disruption of the forming web that would be occasioned by forcing an excess of waer through the carrier and web as the carrier engages the bar. The wipe also serves as a guide, guiding the carrier to strike the bar at the proper angle.

The adjustment of the angular disposition of the flat on the drainage bar permits varying the water removal effectiveness of the bar. This is very helpful in the case of different operating conditions such as different speeds or different paper products. This permits the use of the same drainage elements on a machine for a large number of operaitng conditions. It also permits easy variation of the amount of water removal at the various drainage bars on down the machine.

This adjustment is particularly useful in placing each bar at the position providing the best relationship between water removal and web formation for the particular paper product being made. A certain amount of agitation of the web as it is being formed is usually desirable, particularly for certain fine papers. Too much suction creates the violent disruptions mentioned above, but some agitation is helpful. By empirical methods, the bar can be adjusted after installation to provide just the right amount of suction required at a particular bar to provide the controlled amount of agitation that makes the best paper while removing a suitable amount of water.

Another way of producing a controlled amount of agitation is to follow one bar with another without a wipe between. If the first bar is set to leave the proper amount of water under the carrier, i.e., not too little or too much, this water is carried to the nip at the next bar, where it is forced through the carrier to provide the desired agitation.

It is a primary object of the present invention to provide a drainage element for a Fourdrinier papermaking machine which provides a controllable area of suction. It is still another object of this invention to provide a drainage element which furnishes a desired controlled agitation of the stock on the carrier. It is a further object of the present invention to provide a suction element in the form of a cylindrical bar across the machine under and in contact with the carrier which bar has a limited suction area which can be adjusted by rotational adjustment of the bar. It is a further object of the invention to include a wipe element ahead of the drainage bar to remove excess water from beneath the carrier.

Further objects and advantages of the invention will become apparent from the following description taken in conjunction with the accompanying drawings, in which.

Figure 1:
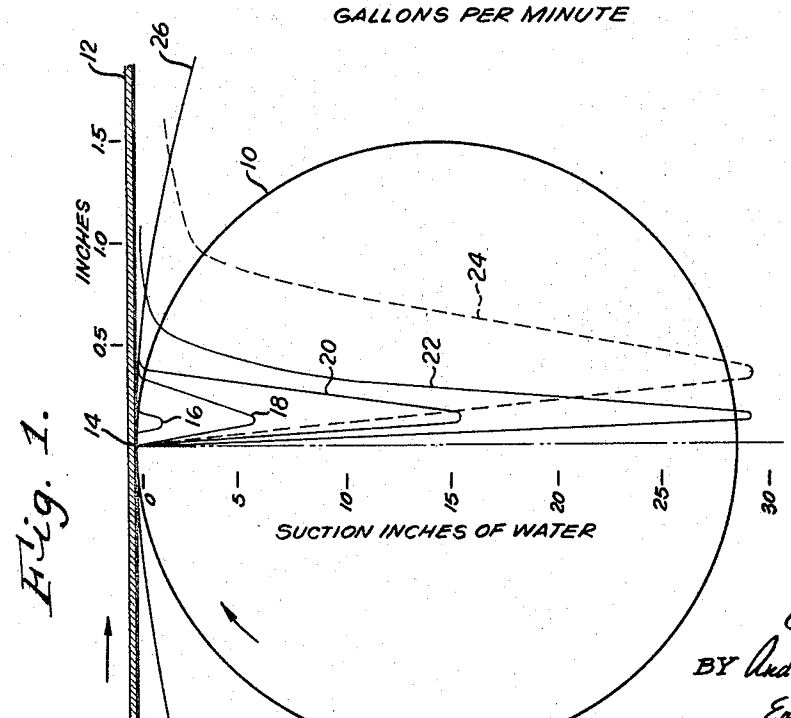
FIGURE 1 is a plot of suction between a forming carrier and a rotating table roll as a function of distance from the top dead center of the roll for various machine speeds and roll sizes.

In FIGURE 1 is shown the suction produced by conventional table rolls in a Fourdrinier papermaking machine. FIGURE 1 shows the well-known relationship between the amount of suction in units of inches of water and the distance from the top dead center of the table roll at various speeds of the forming carrier and table roll. In particular, FIGURE 1 shows this relationship for a three inch table roll 10 and a forming carrier 12 which meet at the top dead center 14 of the table roll. Curves 16, 18, 20 and 22 show the distribution of the suction at speeds of 180 feet per minute, 280 feet per minute, 430 feet per minute and 630 feet per minute, respectively. Curve 24 shows the distribution of the suction at a speed of 630 feet per minute using a larger roll 26, the larger roll being nine inches in diameter rather than the three inches of roll 10. (See article by Bennett: Quantitative Studies of Water Removal by Table Rolls. Tappi, vol. 37, No. 11, pages 534–541, Nov. 1954.) It may be noted that the amount of suction as well as the area over which the suction is effective increases markedly with speed. The use of a larger roll does not change the peak value of the suction, but it does increase the area over which the suction is effective and, therefore, increases the amount of water removal at a particular roll.

It should be noted that the relationships shown in FIGURE 1 are somewhat idealized for the suction does not begin at the top dead center of the roll when the machine is in operation. Rather, the carrier wraps around the roll for a short distance because of the suction and is not tangential as shown in FIGURE 1.

Figure 2:
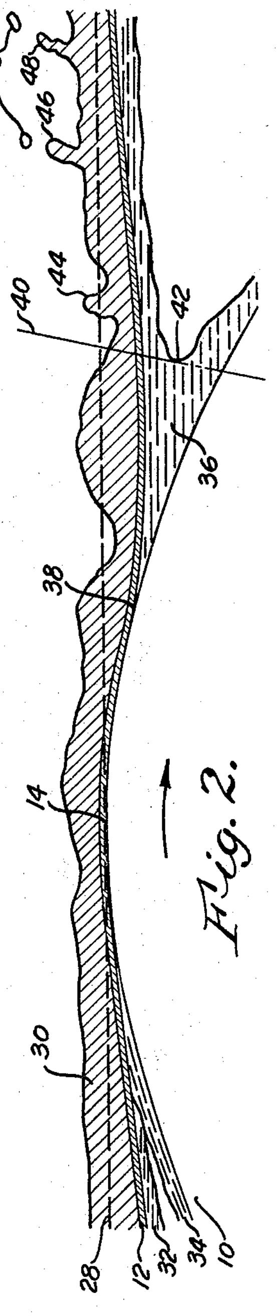
FIGURE 2 is a sectional view of a part of a table roll supporting a forming carrier and a web being formed, showing the drainage of water therefrom.

The true relationship is like that shown in FIGURE 2 where the forming carrier 12 is shown supported by a roll 10. The dashed line 28 represents the horizontal tangent to the roll 10, which is the position the carrier would take in absence of its wrapping around the roll. In FIGURE 2 is shown the web 30 being formed from the stock on the carrier 12. The roll 10 as shown in FIGURE 2, is an intermediate roll. The carrier 12 approaches the roll 10 at an angle inclining upwardly because the carrier was depressed from the line 28 by the action of a preceding roll. The carrier 12 carries a layer of water 32 below the carrier 12, this water having been extracted from the web at the preceding roll. A layer of water 34 is also carried by the roll 10 toward the nip between the carrier 12 and the roll 10, this water 34 having been removed from the web earlier and carried around the roll on the surface of the roll. The water in layers 32 and 34 is driven back through the carrier 12 into the web 30 by the pressing action of the nip between the carrier 12 and the roll 10. This creates a disturbance of the web 30 depending upon the amount of water carried into the nip in layers 32 and 34 and the speed of the carrier and roll. The fabric 12 is thereafter pulled away from the roll 10 at the point 38. This would leave a void in the region 36 between the carrier and the roll and therefore creates suction drawing water from the web 30 through the carrier 12 to fill the void that would otherwise exist in the region 36. This suction in the region 36 is what draws the carrier toward the roll thus causing the carrier 12 to wrap around the roll to the point 38, which is then the point where suction begins rather than beginning at the top dead center 14. Suction is maintained until about the region designated by the line 40 where the region of suction 36 is terminated by the entry of air at the point 42. The air being expansible dissipates the vacuum relatively abruptly. Depending upon the speed of the roll and carrier, a rather large amount of suction is produced in the region 36. The release of this suction creates a rather violent distrubance of the forming web as shown at points 44, 46 and 48. This disruption may be so violent as to cause the stock to jump completely off the forming web as shown by drops 50. Both the columns of stock 46 and 48 as well as the drops 50 falling back upon the web being formed may produce undesirable paper products. Further, the region 36 bounded by the line 40 is not well defined because the air penetrates different distances into the region 36 at different places across the roll. This produces streaks in the paper which are ordinarily undesirable, and especially noticeable in fine light weight papers.

Figure 3:
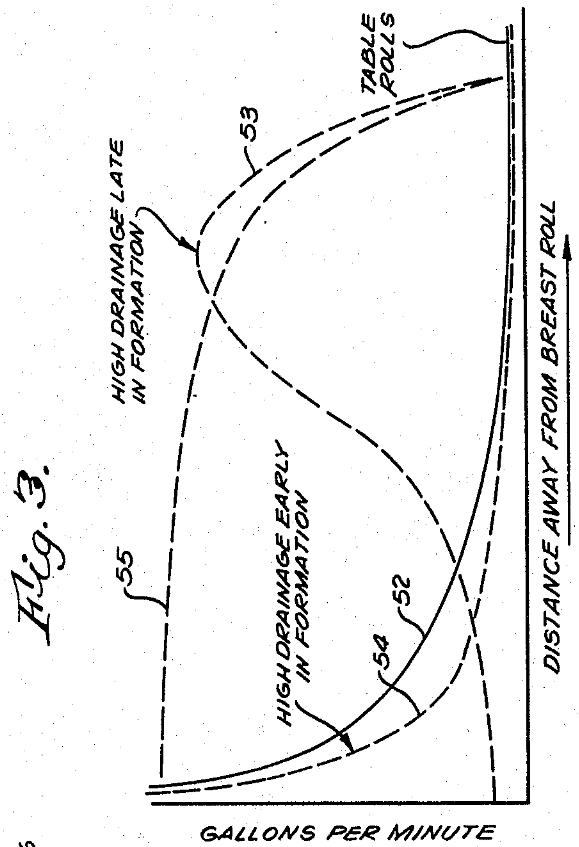
FIGURE 3 is a plot of drawings as a function of distance along the forming carrier using table rolls and the drainage devices of the present invention.

FIGURE 3 shows the distribution of the rate of drainage from the web as the web is being formed in moving away from the breast roll. The curve 52 shows the drainage using conventional table rolls. Note that this provides a relatively high drainage early in the formation of the web with relatively little drainage later on. As noted above, this frequently produces excessive drainage and disruption of the web during its early formative state which is undesirable in certain paper products, such as fine printing papers, and hence limits the speed at which the machine can be run without reducing the quality of the product. Since the higher speeds are more efficient, it is frequently desirable to reduce the drainage in the early stages of formation of the web and provided for greater drainage at a later stage as indicated by the curve 53 of FIGURE 3. The use of the drainage bars of the present invention permits selection of the drainage rate appropriate for the particular product being made and the speed of operation of the machine. This permits selection of drainage rates in accordance with the curve 53. Such rates are desirable for fine grades of book paper, for example. At the same time, for certain products such as corrugating media stock, it may be desirable to have higher drainage than normal early in the formation as shown by the curve 54. This too can be achieved with the proper adjustment of the drainage bars of the present invention. Proper adjustment can also provide the drainage relationship shown by the curve 55, which may be desirable for certain products made from very free stocks, such as speciality kraft papers made with percentages of synthetic fibers.

Figure 4C:
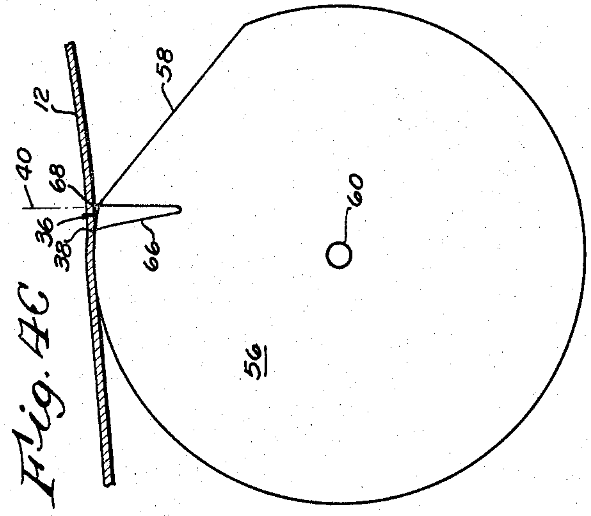
FIGURES 4A, 4B and 4C are plots, like those of FIGURE 1, showing suction as a function of distance using the drainage devices of the present invention in various positions.
Figure 4B:
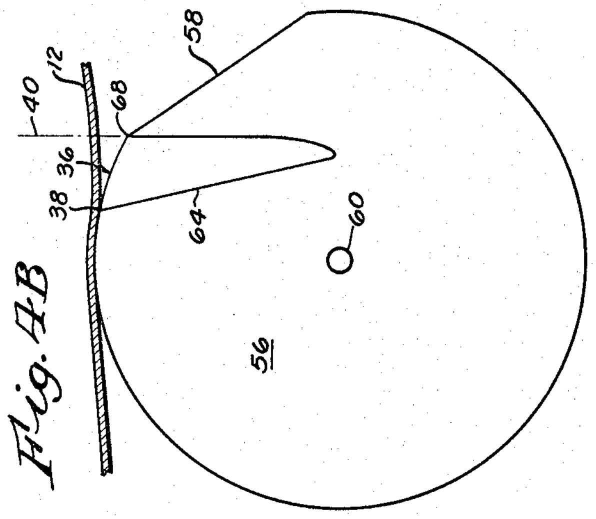
Figure 4A:
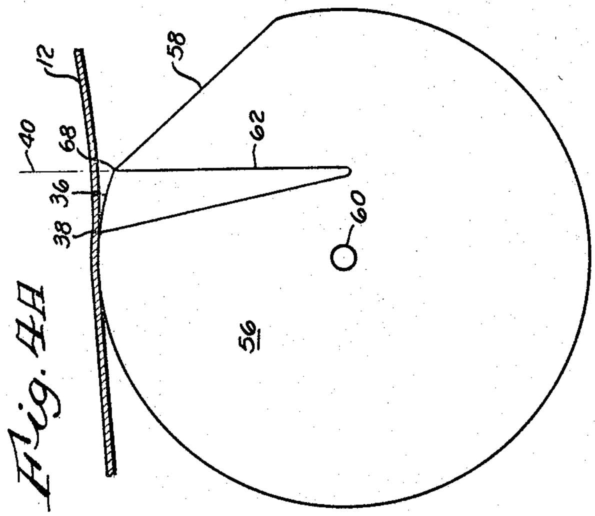

FIGURE 4 shows a simplified arrangement to illustrate the operation of the drainage bars. In particular, it shows the drainage bars 56 in the form of circular cylinders each having a flat segment 58. Each bar 56 is mounted for rotation about its axis 60 in order that the flat portion 58 may be adjusted to a particular angle. The drainage bars 56 would act just like a stationary table roll in absence of the flat 58; that is, it would produce a region of suction where the carrier 12 left the bar 56 just like the roll 10 of FIGURE 2. It is the function of the flat 58 to break the suction; that is, the region between the bar 56 and the carrier 12 is very abruptly widened at the flat section, thus permitting air between the carrier and the bar 56 in the region of the flat 58. The angular disposition of the flat 58 thus effectively determines the end of the region of suction. Comparing it to the table roll 10 shown in FIGURE 2, the position of the flat section thus determines the boundary 40 of the region 36. This effect is illustrated by the differences between the FIGURES 4A, 4B and 4C which show the drainage rates as a function of the distance along the carrier for different adjustments of the angle of the flat 58, these curves being curves 62, 64 and 66 of FIGURES 4A, 4B and 4C, respectively. The total drainage is the area under the curve. It may be noted that the suction drops abruptly substantially to zero at the leading edge 68 of the flat 58. By rotation of the drainage bar 56 to a particular place, this leading edge 68 may be positioned to cause the suction to break at approximately the maximum suction as shown in FIGURE 4A, on the rising portion of the curve as shown in FIGURE 4B or on its descending portion as shown in FIGURE 4C.

Not only does the adjustment feature of the drainage bar permit selection of the drainage rate desired in the particular operation, but the abrupt nature of the leading edge 68 of the flat section 58 breaks the suction at the same point all the way across the sheet, i.e., along the line of the leading edge 68, thus avoiding the streaking produced by the foils and table rolls of the prior art.

As is shown in FIGURES 4A, 4B and 4C, the beginning 38 of the suction region 36 is also dependent upon the position of the flat 58. Also the total suction determines how far the carrier 12 wraps around the bar 56 before leaving the bar. That is, the greater the suction, the longer the carrier 12 is held against the bar 56.

Figure 5:
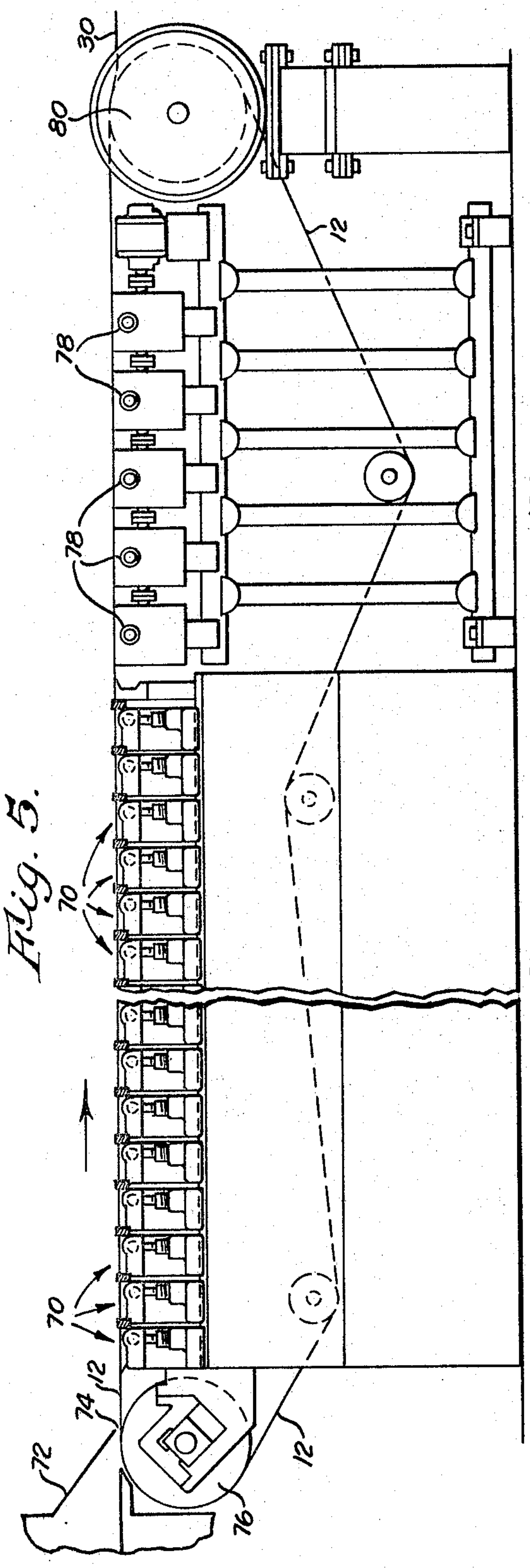
FIGURE 5 is a side elevation of a Fourdrinier papermaking machine utilizing one form of drainage device of the present invention.

FIGURE 5 is a side elevation of a Fourdrinier paper-making machine utilizing one form of the drainage devices 70 of the present invention. As shown in FIGURE 5 the Fourdrinier machine includes a head box 72 terminating in a slice 74 through which stock is supplied to a carrier 12 as it passes over a breast roll 76. The carrier 12 with the stock thereon passes over the drainage devices 70 which remove water as the paper web is being formed. The carrier and the web then pass over suction boxes 78 which remove more water from the web. At the couch roll 80 formed web 30 is removed from the carrier 12, which then returns to the breast roll in endless fashion.

Figures 6, 7, 8, 9:
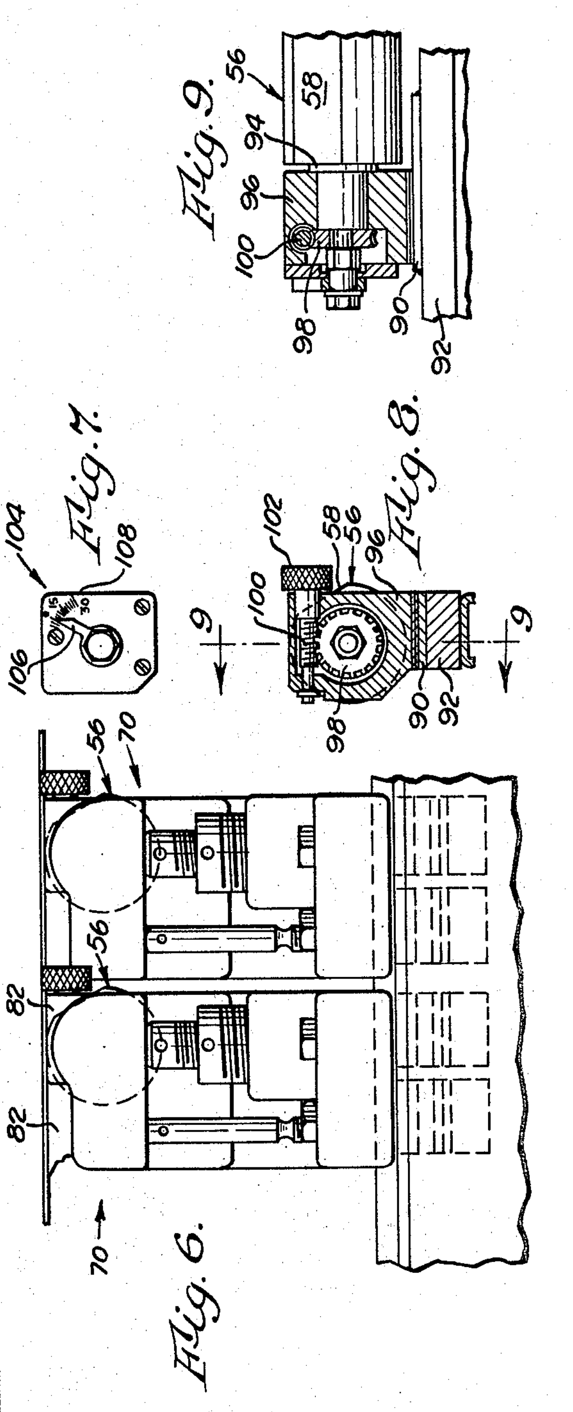
FIGURE 6 is an enlarged view of one of the drainage devices shown in FIGURE 5.
FIGURE 7 is an enlarged view of the indicator of the drainage device shown in FIGURE 5, taken along line 7—7 of FIGURE 13.
FIGURE 8 is a sectional view showing the adjustment mechanism of the drainage device shown in FIGURE 5, taken along line 8—8 of FIGURE 13.
FIGURE 9 is a vertical section of the adjustment mechanism shown in FIGURE 8, taken along line 9—9.

FIGURE 6 shows an enlarged view of two of the drainage devices 70 as used in the apparatus shown in FIGURE 5. FIGURES 7 through 14 and 17 show other views of this same form of drainage device. Basically the drainage device comprises a drainage bar 56 and a wipe 82. The rest of the device is principally the means for mounting and adjusting the position of the drainage bar 56 and wipe 82. As shown particularly in FIGURES 13 and 14, the drainage bar 56 comprises a number of cylindrical tubular sections 84 held together by a rod 86. These tubular sections are mounted on bearing blocks 88 for rotation about the axis of the sections. These bearing blocks 88 are then mounted on pads 90 which are affixed, as by welding, to a support structure 92. The pads 90 are machined to provide such surface that the bearing blocks hold the drainage bar 56 horizontal in order that it may strike the forming carrier uniformly across the length of the drainage element.

As shown best in FIGURE 9, the angular position of the flat segment 58 of the drainage bar 56 may be set by angular adjustment of a pin 94 rigidly fastened to the drainage bar 56 and mounted for rotation about the axis of the drainage bar in a bearing 96 which is mounted on a pad 90 affixed to the support structure 92. The pin 94 is rigidly fastened to a gear 98 which meshes with a worm gear 100 mounted on the bearing block 96. The worm gear is turned by a knob 102 to turn the gear 98 which turns the pin 94 to position the flat segment 58 of the drainage bar 56 relative to the support structure 92. The proper position of the flat 58 depends so much upon the particular operating conditions of the paper machine that it is usually desirable to determine the optimum position by empirical means after the drainage bars are mounted on the machine.

It is helpful to know the particular angle at which the flat is set. To this end, an indicator 104 as shown in FIGURE 7 is mounted on one end of the drainage unit 70. As shown the indicator 104 comprises a pointer 106 fastened to the pin 94 and an indicating dial 108 mounted on the bearing block 96. This scale may conveniently be marked in degrees with zero indicating that the edge 68 of the flat 58 is at top dead center 14. Partly because the carrier 12 may approach the bar 56 at an upward angle, the bar is made adjustable for negative angles and, for example, may be made adjustable from −6° to 18°.

The wipe 82 preferably has the shape illustrated, having a leading edge of 90° or less to the normal and being flat on top. The wipe 82 may be mounted on a support structure 110 which may be like the support structure 92. The support structure 92 and 110 are each then rigidly secured at each end to a support bracket 112. Each of the brackets 112 is mounted by ball and socket joints 114 and 116 onto a pair of legs 118 and 120, respectively. These legs are mounted on a mounting bracket 122 by threaded joints 124 and 126, respectively. Turning the legs 118 and 120 raises or lower the respective ball and socket joints 114 and 116 because of the threaded joints. This permits adjustment of the height of the bracket 112 and thus permits the drainage unit 70 to be placed parallel to the carrier 12 in the cross machine direction. At the same time, the adjustment of only one of the legs 118 or 120 tilts the bracket 112 and thus tilts the supports 92 and 110. This adjusts the plane of the top of the wipe 82. Ordinarily, this plane is adjusted to place the wipe against the carrier 12 and leads the carrier 12 to the drainage bar 56 at the preferred angle. Obviously, the brackets at each end of the support structures must be comparably adjusted. The mounting brackets 122 are slidably mounted on a rail 128 secured to a support 130. The brackets 122 may be moved along the rails to place the drainage units 70 in the proper cross direction and to space the units appropriately one from the other. A clamp 132 clamps the units in position.

Figure 17:
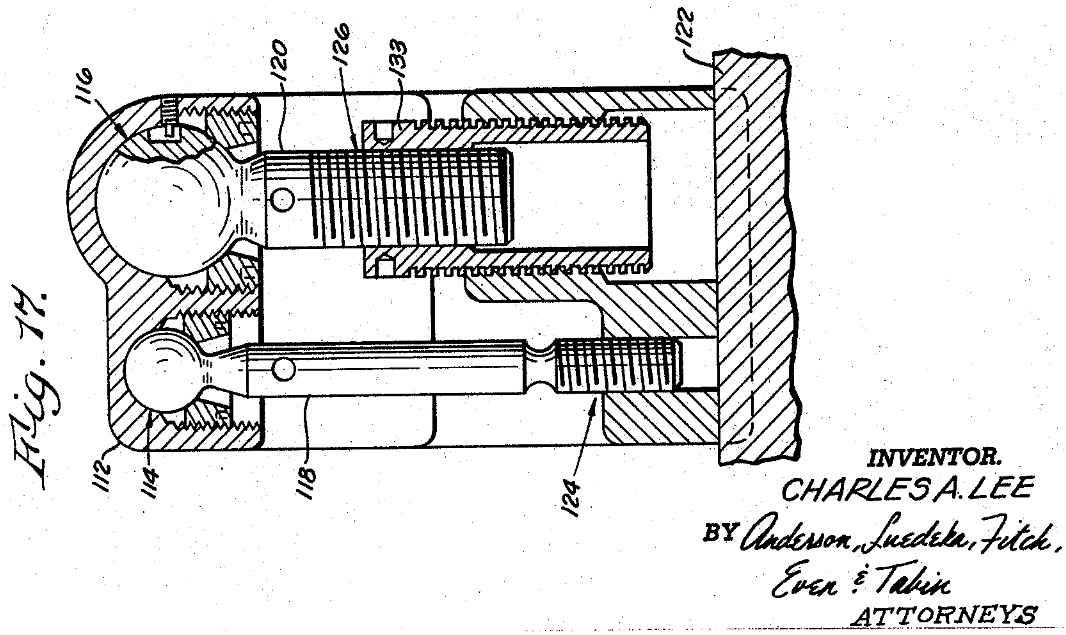
FIGURE 17 is an enlarged vertical section of the mounting device for the drainage device shown in FIGURE 11, taken along line 17—17.

As shown in FIGURE 17 the threaded joint 126 may include a sleeve 133 threaded both internally and externally but with the internal thread having a greater pitch than the external thread. Rotation of this sleeve thus makes a fine vertical adjustment of the length of the leg 120.

Figures 14, 15:
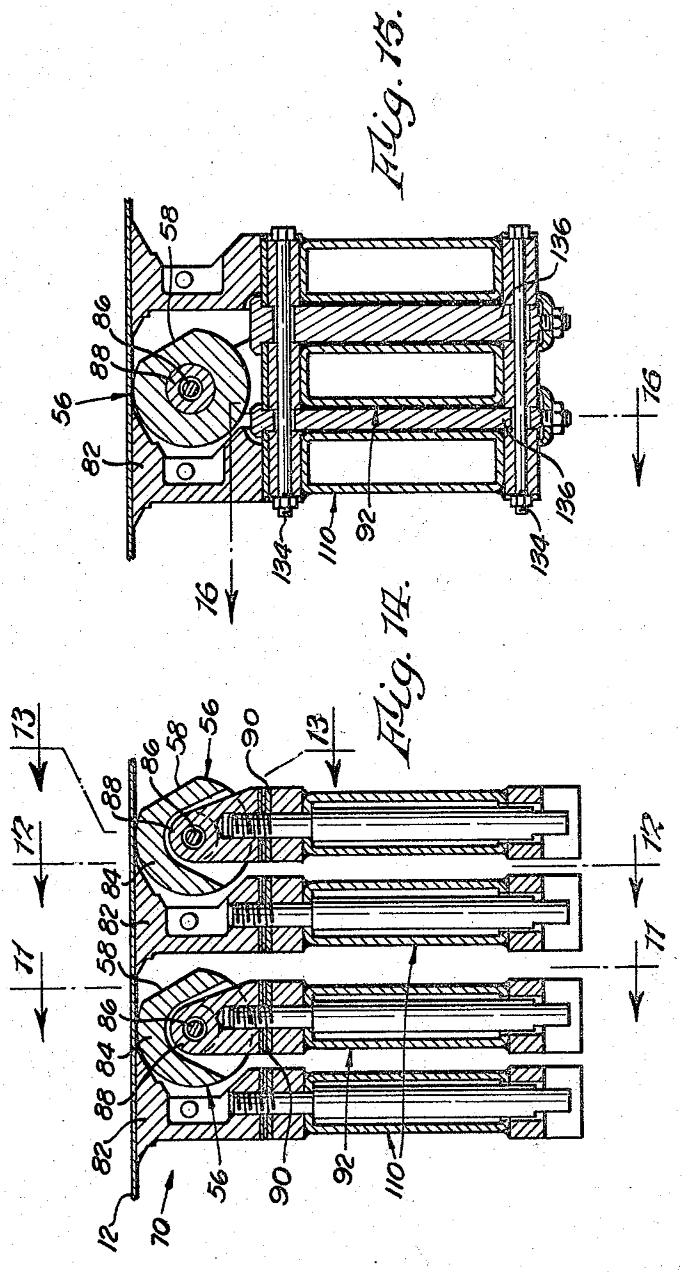
FIGURE 14 is a vertical sectional view of drainage devices such as shown in FIGURE 10, taken along line 14—14 of FIGURE 13.
FIGURE 15 is a vertical sectional view of a modified form of the drainage device, taken along line 15—15 of FIGURE 13.
Figure 19:
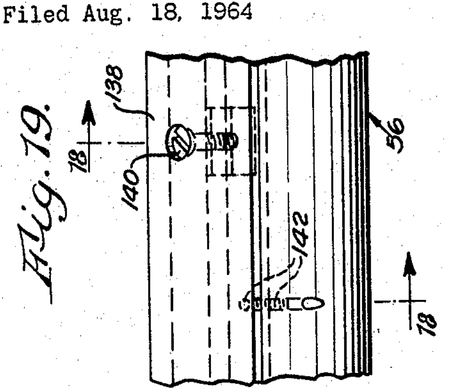
FIGURE 19 is an elevation of the device shown in FIGURE 18, taken along line 19—19.
Figure 18:
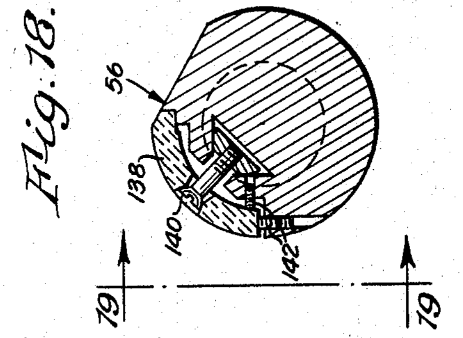
FIGURE 18 is a sectional view showing a modified form of the drainage device shown in FIGURE 5, showing an insert for the wearing surface, taken along line 18—18 of FIGURE 19.
Figure 16:
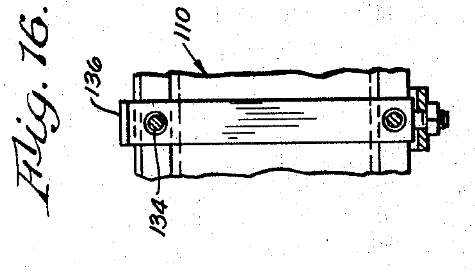
FIGURE 16 is a view, partly in section along line 16—16, showing the spacer used in the drainage device shown in FIGURE 15.

FIGURE 15 shows an alternative mounting of the supports 92 and 110. As shown, they may be held together by bolts 134 and spaced by spacers 136. These units may then be fastened to the brackets 112 which may be positioned as described above.

Figure 23:
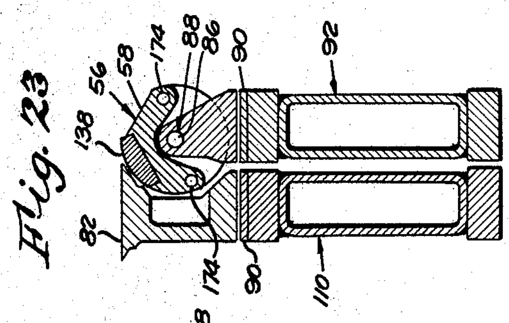
FIGURE 23 is a sectional view of the device shown in FIGURE 21 but with the wipe present, taken along line 23—23.

The surfaces of the drainage bars 56 must be mechanically and chemically suitable for operation on a paper machine. The bars may be made of stainless steel or zinc-plated steel; however, it has been found advantageous to affix inserts 138 in the bar 56 as shown in FIGURES 18, 19, 20, 23 and 24. These inserts would be placed at the regions of wear and may be made of wear resistant material, for example, of Monel, polyurethane, Teflon, hardwood, hard rubber, Micarta, or an extremely hard ceramic such as a self-bonded silicon carbide known as KT silicon carbide. These inserts may be fastened in place by adhesive, as shown in FIGURE 23, or by other means such as the screws 140, as shown in FIGURES 18, 19, 20 and 24. Adjustment of the position of the insert 30 may be made by means such as the screws shown in FIGURES 18 and 19.

Figure 20:
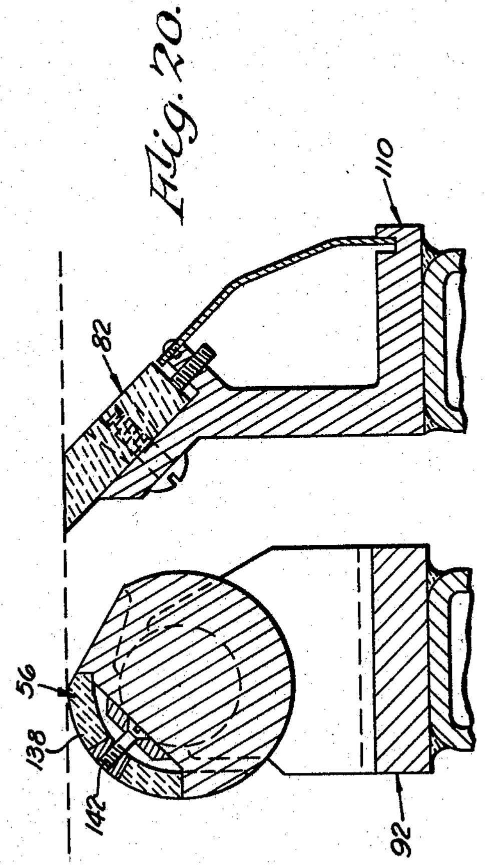
FIGURE 20 is a cross-sectional view of a modified form of drainage bar and wipe used in the drainage device of the present invention, showing separate mounting.

An alternative form of the wipe 82 is shown in FIGURE 20 which also illustrates the independent mounting of the drainage bar 56 and the wipe 82. In the form shown in FIGURE 20, the supports 92 and 110 are mounted on separate mounting brackets thus permitting adjustment of the relative positions of the drainage bar 59 and the wipe 82.

Figure 10:
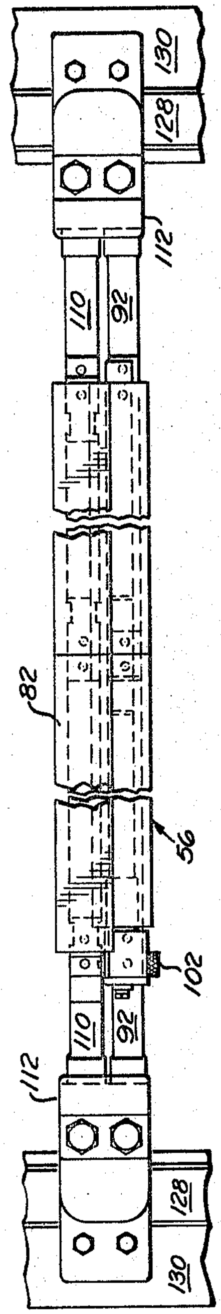
FIGURE 10 is a plan view of one of the drainage devices shown in FIGURE 5.
Figure 11:
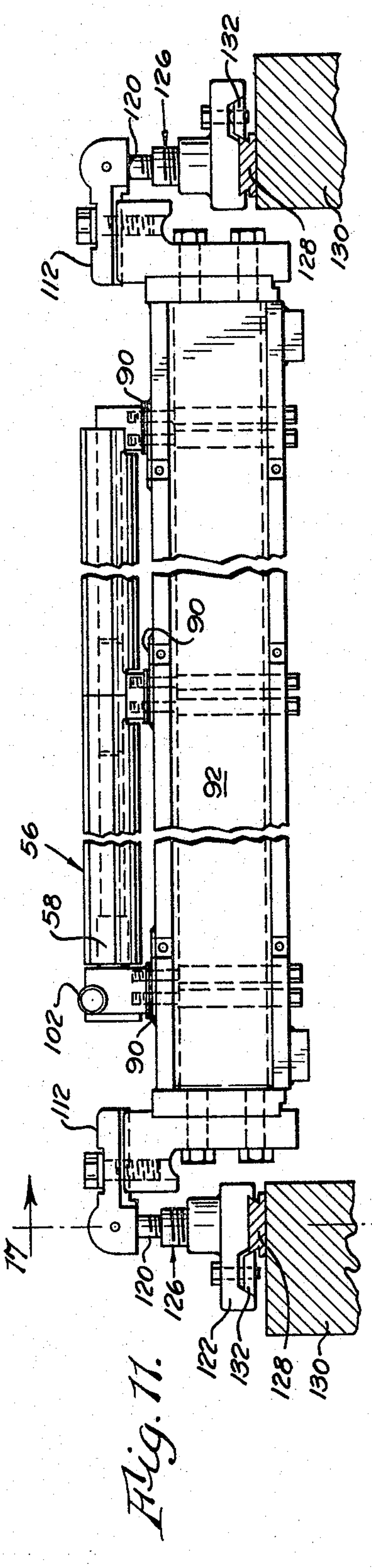
FIGURE 11 is a front elevation of the drainage device shown in FIGURE 10, taken along line 11—11 of FIGURE 14.
Figure 12:
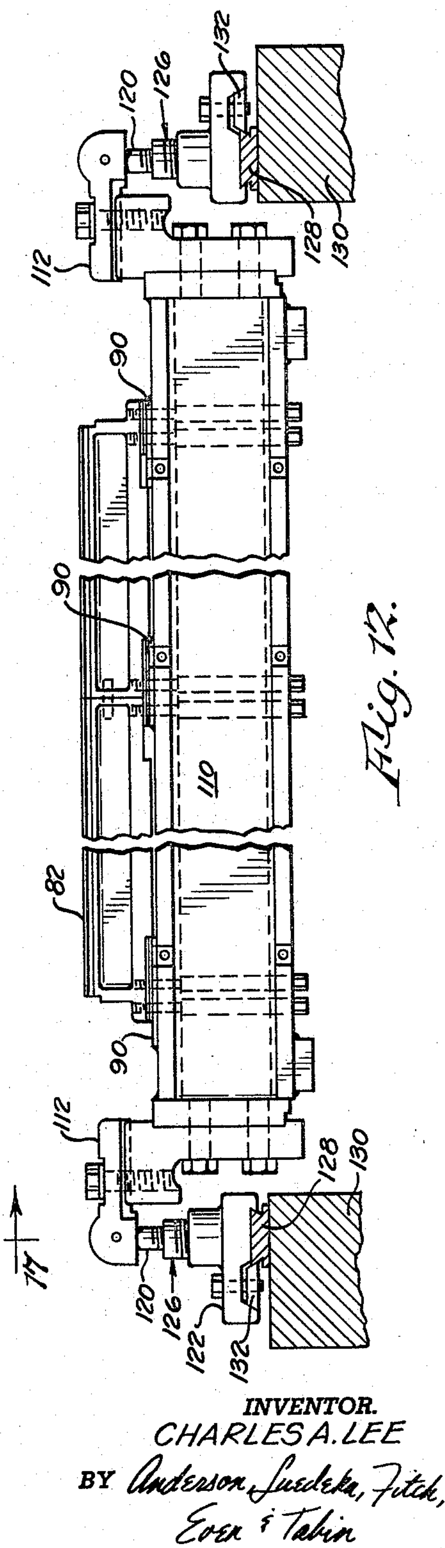
FIGURE 12 is a front elevation of the drainage device shown in FIGURE 10, taken along line 12—12 of FIGURE 14.
Figure 13:
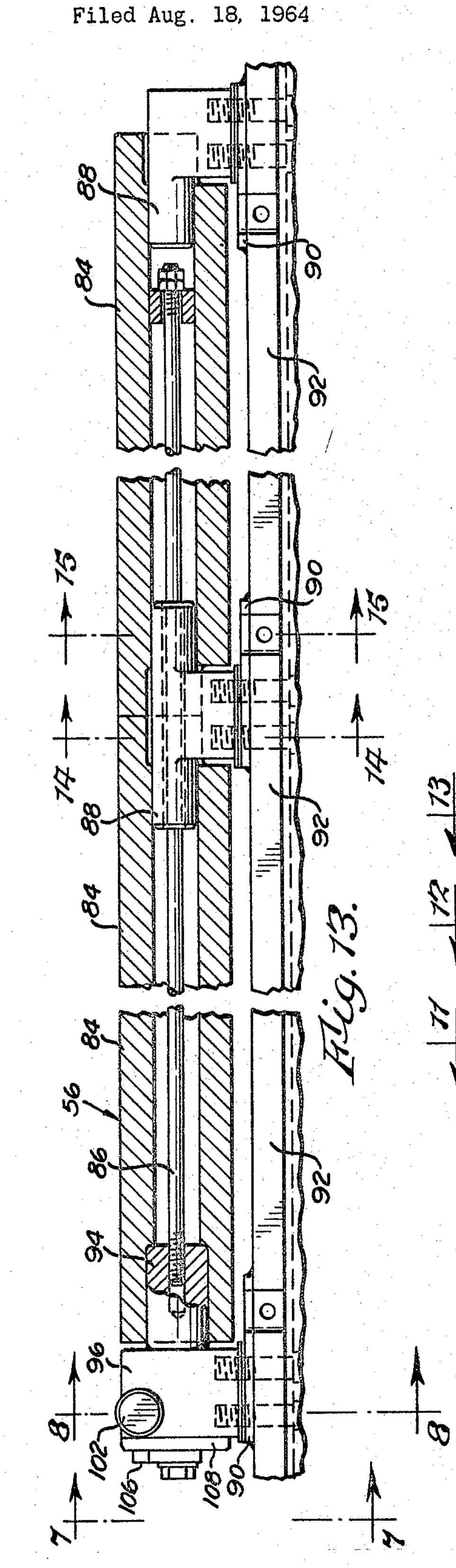
FIGURE 13 is a sectional view of the drainage device shown in FIGURE 10, taken along line 13—13 of FIGURE 14.
Figure 21:
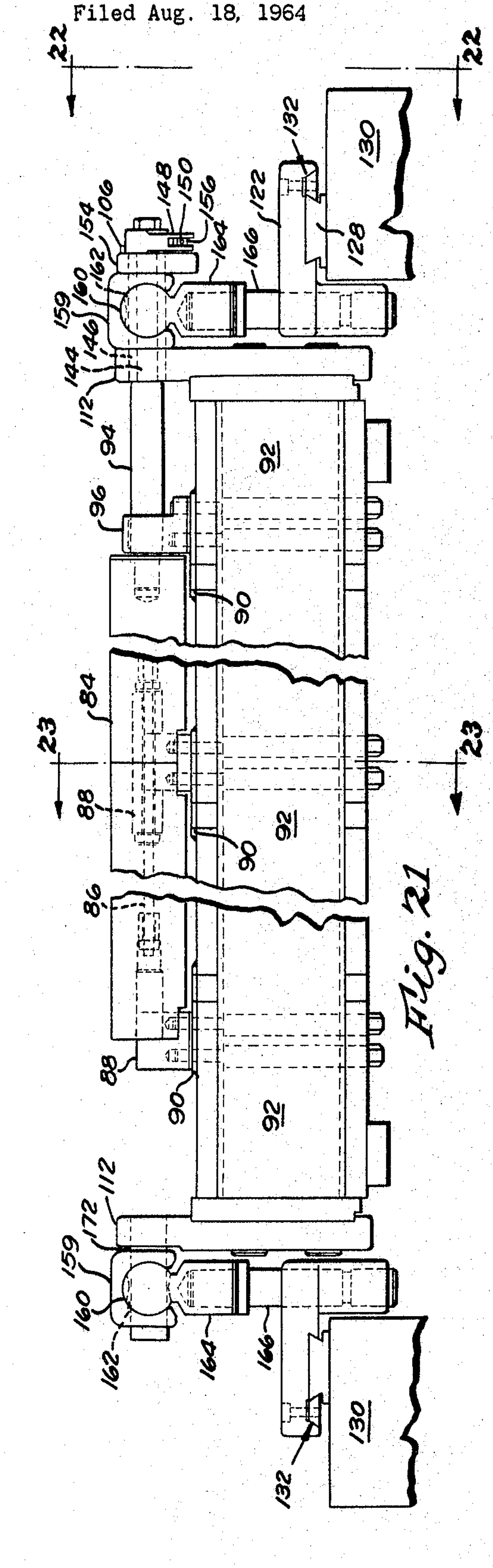
FIGURE 21 is a front elevation of a modified form of the drainage device of the present invention, showing the drainage bar with the wipe removed.
Figure 22:
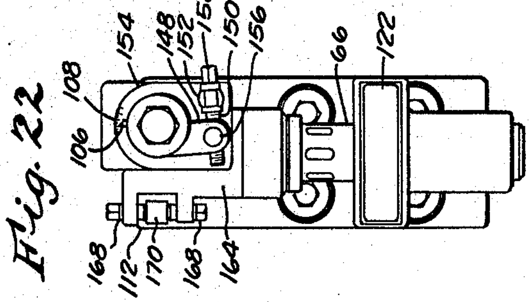
FIGURE 22 is an end elevation of the device shown in FIGURE 21, taken along line 22—22.

An alternative mounting of the drainage unit is shown in FIGURES 21, 22 and 23. The drainage bar 56 and wipe 82 are generally as described above in connection with FIGURES 13 and 14; however, the arrangement for adjusting the angle of the flat 58 has been changed to make it accessible at the edge of the machine. In this case, the pin 94 has an extension 144 extending through a sleeve 146 which is secured to the support 112. The support 112 is somewhat different in shape from the support 112 as shown in FIGURES 10, 11 and 12. In the from of the apparatus shown in FIGURES 21 and 22, the extension 144 of pin 94 is fastened to a lever arm 148. At the same time, a threaded member 150 is pivotally mounted by mounting element 152 on a member 154 which is secured to the sleeve 146. The threaded member 150 mates with a threaded pivotal member 156 which is pivotally connected to lever arm 148. The threaded member 150 has a head 158 which may be adapted for turning by a wrench. The turning of the head 158 thus causes the lever arm 148 to move relative to the member 154, hence causing the pin 94 to rotate relative to the bracket 112. In this case, the dial 108 may be formed on the member 154 and the pointer 106 may be attached to the lever arm 148.

In this embodiment of the invention, tilting of the bracket 112 is achieved in a fashion somewhat different from that shown in FIGURE 17. The sleeve 14 is mounted on a bearing 159. This bearing 159 is then pivotally mounted on a bearing block 160. The bearing block 160 has a central aperture 162 through which the extension 144 and sleeve 146 may pass concentrically. Thus, the bracket 112 may rotate about the bearing block 160 on one axis and the bracket 112 may rotate with the rotation of the sleeve 146 about another axis which intersects the first. Bearing block 160 is mounted on a support 164 which is mounted on a leg 166. Tilting of the bracket 112 and hence the supports 92 and 110 is effected by movement of screws 168 which threadedly engage the support 164 and bear against block 170 which is secured to the bracket 112. The leg 166 is pivotally mounted in the mounting bracket 122 so that upon turning of the leg 166 the support 164 is raised or lowered thereby raising or lowering the bracket 112 to provide proper alignment of the drainage device 70. The angular adjustment of the flat 58 relative to the supporting members 92 and 110 is made but at one end of the device. However, except for this adjustment both end mountings may be comparable; adjustment of tilt and height is made at both ends. A space 172 may be provided to allow for thermal expansion and contraction of the drainage device 70.

Figure 24:
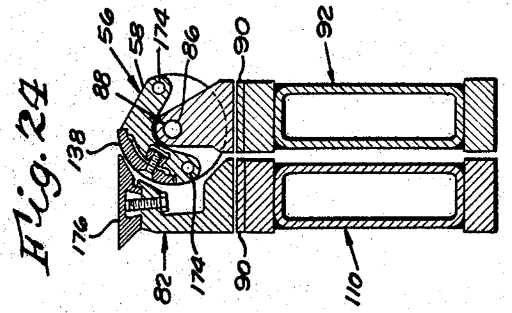
FIGURE 24 is a sectional view of a modified form of the device as shown in FIGURE 23.

As shown in FIGURES 23 and 24, pins 174 may be provided to align the respective sections 84 of the drainage bar 56. FIGURE 24 also shows an alternative form of wipe wherein the wearing surface is formed by a wearing member 176.

Figure 29:
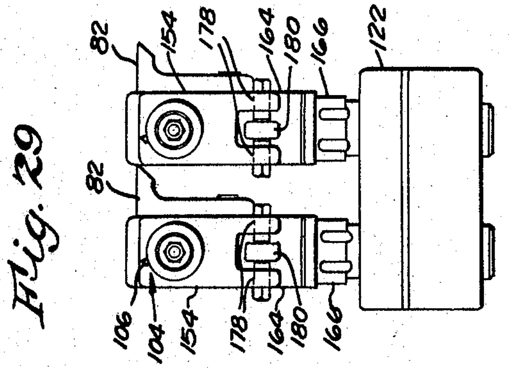
FIGURE 29 is an end elevation of the device shown in FIGURE 25, taken along line 29—29.
Figure 25:
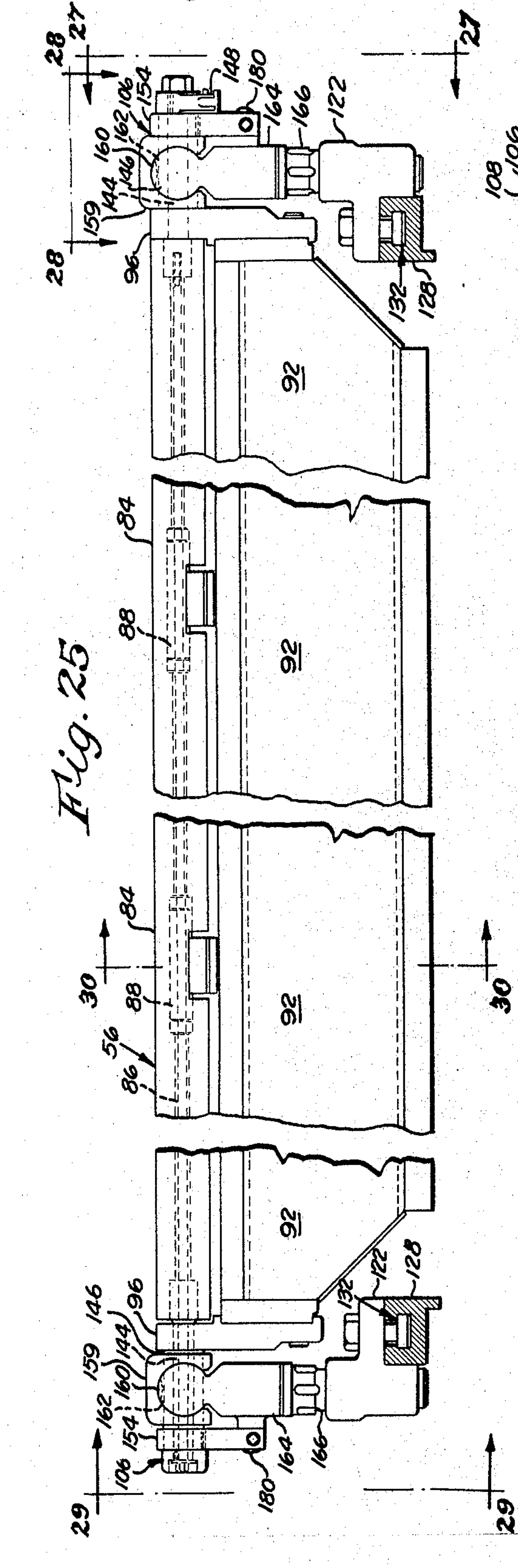
FIGURE 25 is a front elevation of a modified form of the drainage device of the present invention, showing the drainage bar with the wipe removed.
Figures 26, 27, 28, 30:
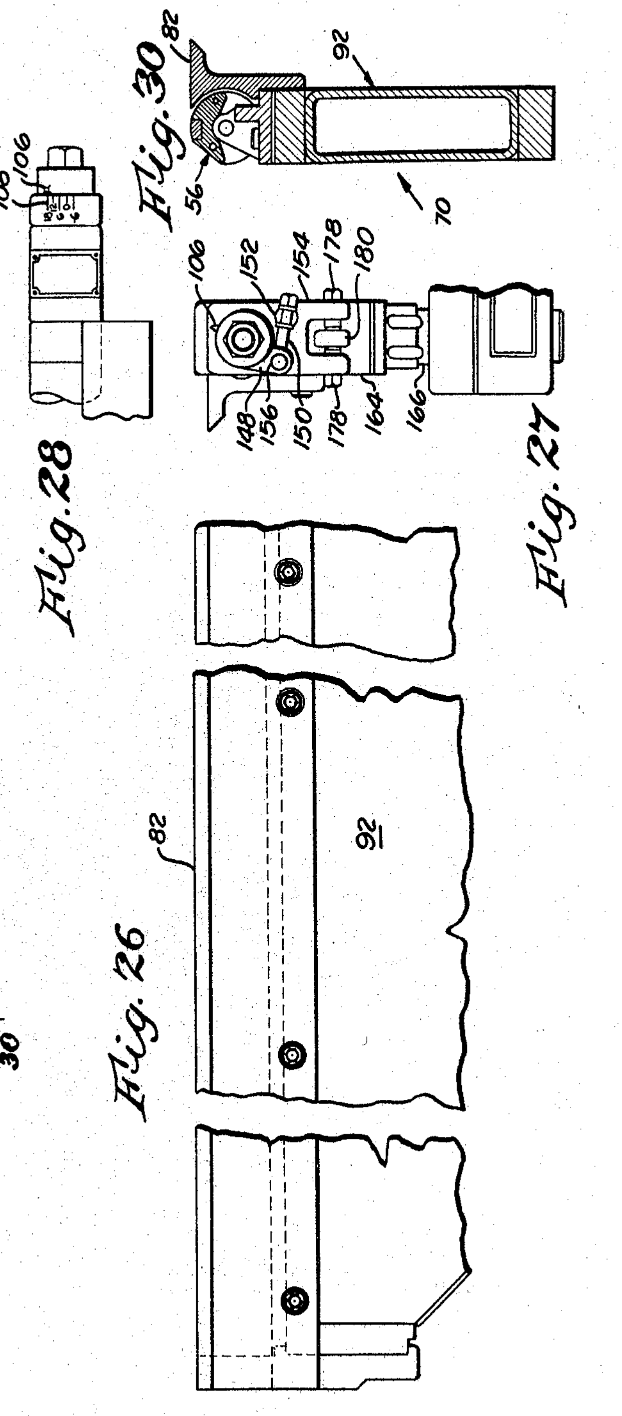
FIGURE 26 is a partial front elevation of the wipe used with the device shown in FIGURE 25.
FIGURE 27 is a partial end elevation of the device shown in FIGURE 25, taken along line 27—27.
FIGURE 28 is a partial plan view of the indicator on the device shown in FIGURE 25, taken along line 28—28.
FIGURE 30 is a sectional view of the device shown in FIGURE 25 but with the wipe present, taken along 30—30.

Another form of the drainage device 70 is shown in FIGURES 25 and 30. Except for certain of the mounting arrangements, the apparatus shown in FIGURES 21 to 23. One important difference is that the wipe 82 is mounted on the same support bracket 92 as the drainage bar 56. As shown particularly in FIGURE 27 the tilting arrangement is slightly different. In this case, screws 178 are threadedly mounted in the member 154 and bear against a block 180 secured to the support 164. Further, the apparatus includes an indicator 104 on both ends of the device. Further, as shown particularly in FIGURE 29, two drainage units 70 are mounted on the same mounting bracket 122, and the latter is mounted on the rail 128 in a somewhat different fashion and clamped with a slightly different clamp 132.

Figure 31:
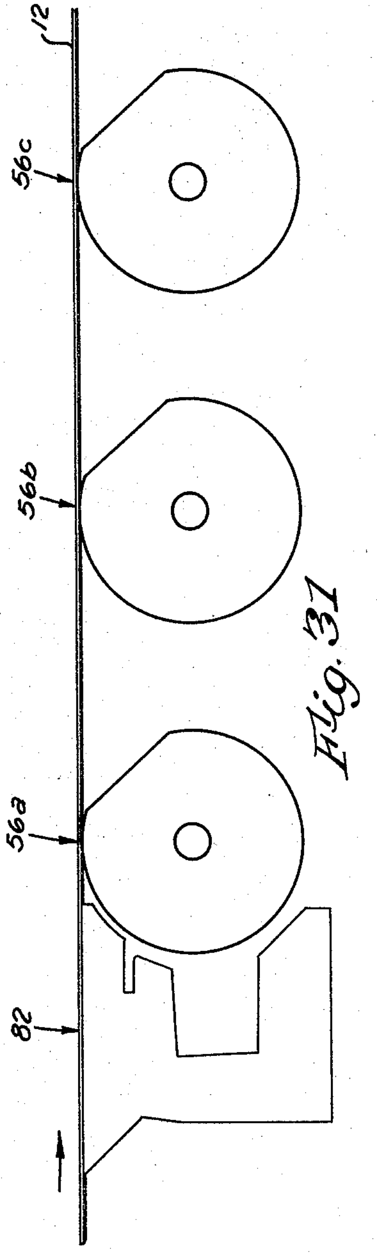
FIGURE 31 is a diagrammatic illustration of an alternative arrangement of wipe and drainage bars in which a single wipe is followed by several drainage bars.

The drainage devices as described in detail above provide for the adjustment of the drainage bars to the position providing optimum drainage, by which is meant the drainage best providing the paper product desired. It includes the adjustment providing the desired agitation of the web as it is being formed. As mentioned above, it is also possible to provide controlled agitation of the web by permitting the proper amount of water to pass into the nip between the carrier 12 and the drainage bar 56. Such an arrangement is shown in FIGURE 31 which shows three drainage bars 56*a*, 56*b* and 56*c* following a single wipe 82. A certain amount of water removed from the web by the first drainage bar 56*a* is carried along beneath the carrier 12 and is thus carried into the nip sired controlled agitation at the second drainage bar 56*b*. Appropriate setting of the first drainage bar 56*a* thus provides the appropriate amount of water to cause the desired controlled agitation at the second drainage bar 56*b* This same phenomenon may be used at third drainage bar 56*c* and succeeding drainage bars.

Although various embodiments of the present invention have been shown and described in detail, various modifications may be made therein within the scope of the present invention.

The radius of the drainage bar is important. However, different sizes may be required to cover different ranges of operation, and to accommodate different ranges of speed. Radii of from one to two inches have been found particularly desirable for certain papermaking operations, although radii of from one-half to twelve inches is desirable under different conditions.

The drainage bars are shown and described above as being made of circular tubes with flat sections formed thereon. However, as is evident from FIGURE 14, the cross section of the bar does not need to be a complete circle for only the surface in the suction region is effective in the removal of water. Further, the flat section 58 need not even be flat. What is important is that the surface producing the suction terminate abruptly at a straight edge and that the position of this edge be adjustable relative to the region of contact to adjust the active suction area. For example, the flat section could be concave instead. It is important that the active surface be convex and cylindrical. The surface should be cylindrical in order that it may remain in contact with the carrier as the position of the bar is changed.

It is preferred that this surface be part of a circular cylinder with the drainage bar adjustable about the axis of this cylindrical surface. This permits changing of the effective suction area merely by rotation of the bar while keeping the bar in the desired contact with the carrier. However, it is also within the broad scope of the present invention to utilize a cylindrical surface other than part of a circular cylinder and providing means such as cams to adjust the relative height of the bar as it is rotated in order to keep the surface in appropriate contact with the carrier. Thus the term "cylindrical" is used in its broad sense to define a surface generated by a straight line moving parallel to a fixed straight line. (See Webster's New Collegiate Dictionary.) It is important to the design of the drainage bars of the present invention that they provide a convex cylindrical surface terminating abruptly in a straight line, and that means be provided to adjust the region of contact between the surface and the forming carrier in order to vary the suction area following the nip between the carrier and the bar; this provides adjustable suction and drainage as desired to form the particular paper product being made.

Still other modifications may be made within the scope of the present invention. Various modifications are set forth in the following claims.

What is claimed is:

1. In a Fourdrinier papermaking machine having a moving forming carrier on which a fibrous web is formed, a stationary drainage device supporting said moving forming carrier for removing water from the fibrous web being formed on the carrier, said carrier being moved at a rate carrying the water in the web and carrier through the nip between the carrier and the drainage device, said drainage device comprising a member having a convex cylindrical surface extending across the machine under and in a line of contact with the carrier, whereby the divergence of said carrier from said cylindrical surface as it leaves the nip therebetween creates a region of suction on the lower surface of said carrier effective to remove water from said carrier and said web, said cylindrical surface terminating abruptly downstream along a straight edge substantially parallel to the carrier, said straight edge being formed by the intersection of said cylindrical surface and another surface of said member extending from said edge in a direction away from the carrier, said straight edge being at a predetermined distance from said line of contact with the carrier to provide downstream therefrom an abrupt increase in the space between the carrier and the member in the region of suction to terminate the suction abruptly along a line extending across the carrier at the location of the abrupt increase in space between the carrier and the drainage member.

2. In a Fourdrinier papermaking machine having a moving forming carrier on which a fibrous web is formed, a stationary drainage device supporting said moving forming carrier for removing water from the fibrous web being formed on the carrier, said carrier being moved at a rate carrying the water in the web and carrier through the nip between the carrier and the drainage device, said drainage device comprising a member having a convex cylindrical surface extending across the machine under and in a line of contact with the carrier in one region of said surface, whereby the divergence of said carrier from said cylindrical surface as it leaves the nip therebetween creates a region of suction on the lower surface of said carrier effective to remove water from said carrier and said web, said cylindrical surface curving away from the carrier downstream from said region of contact and terminating abruptly along a straight edge substantially parallel to the carrier to provide downstream from said edge an abrupt increase in the space between the carrier and the member in the region of suction to terminate said suction abruptly, said straight edge being formed by the intersection of said cylindrical surface and another surface of said member extending from said edge in a direction away from the carrier, and means for rotating said member to shift said region of contact and thereby adjust the extent of said surface between said contact and said edge to control the effective area of said drainage device, said member including an insert formed of wear resistant material over said region of contact.

3. In a Fourdrinier papermaking machine having a moving forming carrier on which a fibrous web is formed, a stationary drainage device supporting said moving forming carrier for removing water from the fibrous web being formed on the carrier, said carrier being moved at a rate carrying the water in the web and carrier through the nip between the carrier and the drainage device, said drainage device comprising a member having a circularly cylindrical surface extending across the machine under and in a line of contact with the carrier in one region of said surface, whereby the divergence of said carrier from said cylindrical surface as it leaves the nip therebetween creates a region of suction on the lower surface of said carrier effective to remove water from said carrier and said web, said cylindrical surface curving away from the carrier downstream from said region of contact and terminating abruptly along a straight edge substantially parallel to the carrier to provide downstream from said edge an abrupt increase in the space between the carrier and the member in the region of suction to terminate said suction abruptly, said straight edge being formed by the intersection of said cylindrical surface and another surface of said member extending from said edge in a direction away from the carrier, and means for rotating said member about the axis of said cylindrical surface to shift said region of contact and thereby adjust the extent of said surface between said contact and said edge to control the effective area of said drainage device.

4. In a Fourdrinier papermaking machine having a moving forming carrier on which a fibrous web is formed, a stationary drainage device supporting said moving forming carrier for removing water from the fibrous web being formed on the carrier, said carrier being moved at a rate carrying the water in the web and carrier through the nip between the carrier and the drainage device, said drainage device comprising a member having a circularly cylindrical surface extending across the machine under and in a line of contact with the carrier in one region of said surface, whereby the divergence of said carrier from said cylindrical surface as it leaves the nip therebetween creates a region of suction on the lower surface of said carrier effective to remove water from said carrier and said web, said member further having a flat surface diverging abruptly in a direction away from the carrier downstream from said region of contact and intersecting said cylindrical surface along a straight edge substantially parallel to the carrier to provide downstream from said edge an abrupt increase in the space between the carrier and the member in the region of suction to terminate said suction abruptly, and means for rotating said member about the axis of said cylindrical surface to shift said region of contact and thereby adjust the extent of said surface between said contact and said edge to control the effective area of said drainage device.

5. In a Fourdrinier papermaking machine having a moving forming carrier on which a fibrous web is formed, a stationary drainage device supporting said moving forming carrier for removing water from the fibrous web being formed on the carrier, said carrier being moved at a rate carrying the water in the web and carrier through the nip between the carrier and the drainage device, said drainage device comprising a member having a convex cylindrical surface extending across the machine under and in a line of contact with the carrier in one region of said surface and curving continuously away from said carrier downstream from said one region to provide a water removal region wherein the gradually increasing distance between the stationary surface and the moving carrier creates a regions of suction, said surface terminating abruptly downstream along a straight edge substantially parallel to the carrier to provide an abrupt increase in the space between the carrier and the member in the region of suction to terminate said suction abruptly, said straight edge being formed by the intersection of said cylindrical surface and another surface of said member extending from said edge in a direction away from the carrier, and means for moving said surface to adjust said region of contact, and the extent of said surface between said region of contact and said edge to control the effective suction area of said drainage device while retaining substantially the same angular relationship between said surface and said carrier.

6. In the machine as set forth in claim 5, means to support said member at both its ends on the frame of the paper machine, said support means including means to adjust the vertical position of each end of said member.

7. In the machine as set forth in claim 5, means to support said member at both its ends on the frame of the paper machine, said support means including means to adjust the horizontal position of each end of said member.

8. In the machine as set forth in claim 5, a wipe element across the machine adjacent to said member, said wipe element having a top surface in contact with the carrier with its leading edge no greater than a right angle and operative to remove excess water from underneath the carrier.

9. In the machine as set forth in claim 8, a common support for said member and said wipe element on each side of the machine, and means to adjust said supports thereby to vary the angular relationship between said top surface of said wipe element and said member.

References Cited

UNITED STATES PATENTS

| | | | |
|---|---|---|---|
| 2,928,465 | 3/1960 | Wrist | 162—352 |
| 3,066,068 | 11/1962 | Calehuff et al. | 162—374 |
| 3,239,409 | 3/1966 | Knowles | 162—374 |

DONALL H. SYLVESTER, *Primary Examiner.*

J. H. NEWSOME, H. R. CAINE, *Assistant Examiners.*